United States Patent
Verdier et al.

(10) Patent No.: US 9,574,603 B2
(45) Date of Patent: Feb. 21, 2017

(54) LEAK-PROOF FASTENING DEVICE

(71) Applicant: LISI AEROSPACE, Paris (FR)

(72) Inventors: Florent Verdier, Rueil Malmaison (FR); Benoit Regnard, St Germain de la Grange (FR)

(73) Assignee: LISI AEROSPACE, Paris (FR)

( * ) Notice: Subject to any disclaimer, the term of this patent is extended or adjusted under 35 U.S.C. 154(b) by 58 days.

(21) Appl. No.: 14/073,116

(22) Filed: Nov. 6, 2013

(65) Prior Publication Data

US 2014/0130957 A1 May 15, 2014

(30) Foreign Application Priority Data

Nov. 12, 2012 (FR) .................................... 12 60756

(51) Int. Cl.

| | |
|---|---|
| B32B 7/08 | (2006.01) |
| B29C 65/48 | (2006.01) |
| B29C 65/00 | (2006.01) |
| B32B 37/00 | (2006.01) |
| B32B 7/12 | (2006.01) |
| F16B 1/00 | (2006.01) |
| F16B 37/08 | (2006.01) |
| F16B 43/00 | (2006.01) |

(Continued)

(52) U.S. Cl.
CPC .............. *F16B 43/001* (2013.01); *F16B 19/05* (2013.01); *F16B 39/225* (2013.01); *B29C 65/485* (2013.01); *B29C 65/561* (2013.01); *B29C 65/562* (2013.01)

(58) Field of Classification Search
CPC .... F16B 43/001; F16B 33/004; F16B 11/006; F16B 37/044; F16B 37/048; F16B 39/225; F16B 5/02; Y10S 411/90; Y10S 411/93; B29C 65/48; B29C 65/483; B29C 65/485; B29C 65/56; B29C 65/562
USPC .......... 156/60, 66, 71, 91, 92, 293, 294, 295, 156/307.1, 307.3, 307.7, 325, 326, 327; 411/82, 82.2, 427, 432, 531, 533, 542, 411/368, 369
See application file for complete search history.

(56) References Cited

U.S. PATENT DOCUMENTS 3,550,498 A 12/1970 Briles
3,639,137 A * 2/1972 Marinelli .................. 428/321.5
(Continued)

FOREIGN PATENT DOCUMENTS

EP 1903221 3/2011
FR 2946707 12/2010

*Primary Examiner* — Philip Tucker
*Assistant Examiner* — Brian R Slawski
(74) *Attorney, Agent, or Firm* — Henricks, Slavin & Holmes LLP

(57) ABSTRACT

The present invention pertains to a washer (11) for a female fastener (12, 12A), particularly a nut or collar, said washer comprising an annular base (15) and a substantially cylindrical skirt (13) of an outer periphery of the annular base, said annular base comprising a central orifice (18) coaxial with the axis (14) of the skirt, characterized in that the annular base is at least partially covered with a layer (21) of a viscous composition capable of forming a liquid-tight coating through polymerization.

Figure 1A:
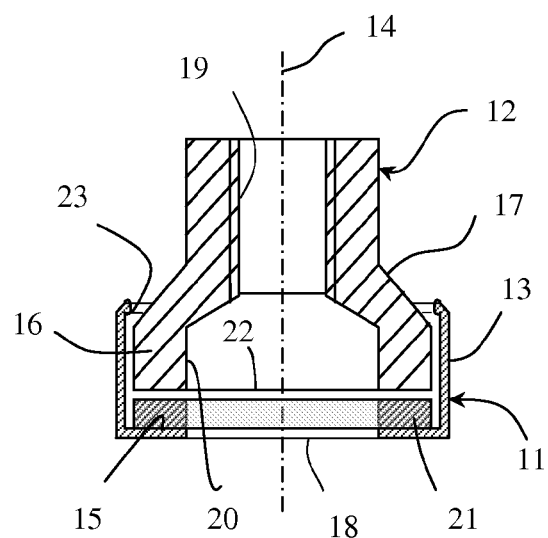

When installing a nut having such a washer onto a male fastener such as a pin (33), the spreading of the viscous layer makes it possible to fill in the gaps (36) of the assembly, the polymerization of the composition ensuring its leak-tightness afterwards.

15 Claims, 2 Drawing Sheets

(51) Int. Cl.
*F16B 33/00* (2006.01)
*F16B 39/22* (2006.01)
*F16B 19/05* (2006.01)
B29C 65/56 (2006.01)

(56) References Cited

U.S. PATENT DOCUMENTS

| | | | |
|---|---|---|---|
| 3,742,808 A * | 7/1973 | Trembley | 411/432 |
| 4,986,712 A | 1/1991 | Fultz | |
| 6,665,922 B2 | 12/2003 | Schultz | |
| 2012/0168055 A1* | 7/2012 | Bray et al. | 156/64 |
| 2012/0237289 A1 | 9/2012 | Guerin | |

* cited by examiner

LEAK-PROOF FASTENING DEVICE

The present invention pertains to a pin/nut fastening device. More specifically, the invention pertains to a leak-proof fastening device. The invention particularly applies to the domain of aeronautics.

The use of pin/nut or lockbolt/collar fastening devices is very common in the aeronautics industry, particularly for joining two structural elements together. It is common that such attachments are required to be impermeable to liquid or gas leaks, for example in fuel tanks, or to avoid the presence of moisture that may cause corrosion in the assembled elements.

In order to achieve such leak-tightness, a known solution is to apply a sealant between the male fastener—the pin or lockbolt—and the bore in which it is held. After installing the appropriate female fastening device—the nut or collar—, the sealant hardens as a result of the polymerization of its components, which ensures that the fastener/structure assembly is both leak-proof and protected from corrosion.

However, applying sealant to a bore is a difficult task, which increases the time and cost of installing the fasteners.

Furthermore, when installing the female fastener onto the male fastener, for example when tightening the nut onto the pin or the collar on the lockbolt, heavy friction should be avoided between the female fastener and a structural panel. Such friction would risk damaging the panel, which in current practice is frequently made of a composite material.

One known solution consists of providing the nut with a captive washer, as described, for example, in document U.S. Pat. No. 4,986,712. In that document, the washer is held in place by claws on the base of the nut. This binds the washer to the nut, leaving the nut free to rotate relative to the washer.

Whenever a nut/washer assembly as described in document U.S. Pat. No. 4,986,712 is used in a fastener for a structural panel, screwing the nut onto a pin causes the washer to come into contact with one of the panels. In order to tighten the nut to the desired tightening torque, it is essential in this case for the friction force to be lower between the nut and the washer than between the washer and the panel. This way, the washer remains fixed with respect to the panel, while the nut continues to rotate with respect to the washer, in order to arrive at the desired tightening torque.

In document U.S. Pat. No. 4,986,712, the nut surface in contact with the washer is covered with a cadmium-based coat that is itself covered with a wax. This wax provides lubrication between the nut and the washer.

The subject matter of the invention is an assembly comprising a washer, which itself both lubricates the washer/female fastener interface and makes the final assembly leak-proof, while enabling easy installation.

More specifically, one aspect of the invention pertains to a washer for a female fastener of the nut or collar type, said washer comprising an annular base and a substantially cylindrical skirt extending from the outer periphery of the annular base, said annular base being at least partially covered with a viscous-composition layer capable of forming a liquid-tight coating through polymerization.

When an assembly formed of such a washer and a female fastener is attached to a male fastener, the viscous-composition layer is capable of lubricating the washer/female fastener interface. Furthermore, the viscous composition will be spread by the movement of the female fastener, which will lead to the formation of a leak-proof seal after polymerization.

The viscous composition may be a sealing compound known from the prior art, particularly a liquid polysulfide-based sealant mixed with an oxygen donor reagent.

Another aspect of the invention pertains to an assembly comprising a washer as described above and a female fastener onto which said washer is installed, the female fastener being free to rotate along the axis of the skirt relative to the washer.

According to one embodiment of the invention, the female fastener is assembled onto the washer by joining it with the viscous composition layer. It is thereby possible to manipulate the female fastener/washer assembly without those elements coming apart.

According to one alternative, the skirt of the washer has elastic mating means for joining with the female fastener, said means allowing the female fastener to rotate with respect to the washer. It is thereby possible to snap the washer onto a previously chosen female fastener, before joining it with a male fastener such as a pin or lockbolt.

Another aspect of the invention pertains to a leak-proof assembly method of a fastening system, said system comprising:
- a washer as described above
- a female fastener capable of being installed to freely rotate axially on the washer
- a male fastener having an end capable of cooperating with the female fastener said method comprising the following steps:
- inserting the male fastener into a bore of structural elements to be fastened
- placing the washer onto the female fastener, the viscous-composition layer being positioned between a flat proximal face of the female fastener and the annular base of the washer
- installing the female fastener/washer assembly onto the end of the male fastener, to the point that the washer is brought in contact with one of the structural elements to be fastened, in order to lock the axial rotation of said washer relative to said structural element or protect the structural element from deforming forces due to the female fastener
- continuing to install the female fastener, its movement relative to the washer causing the viscous composition to spread towards the male fastener, in order to fill in the gaps formed between the male fastener and the female fastener and/or between the male fastener and the bore
- once the installation of the female fastener is complete, hardening the viscous composition through polymerization.

The hardening of the viscous composition allows the assembly to become leak-proof, as well as to keep it protected from corrosion. The presence of the viscous composition on the washer relieves the operator of difficult tasks such as applying sealant within the bore or around the pin thread.

Figure 1B:
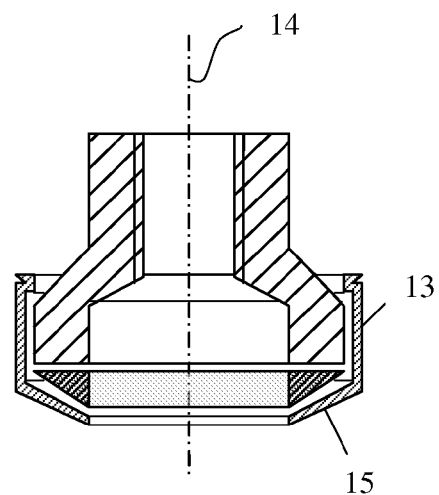

The invention will be better understood upon reading the following description and examining the accompanying figures. These figures are given as an example and do not limit the invention. They show:

FIG. 1A: Cross-section view of a nut/washer assembly according to one embodiment of the invention FIG. 1B: Cross-section view of a nut/washer assembly according to another embodiment of the invention FIG. 1C: Cross-section view of a collar/washer assembly according to one embodiment of the invention FIG. 2: Cross-section view of a pin/nut fastening system as it is being assembled, according to one embodiment of the invention FIG. 3: Cross-section view of a lockbolt/collar fastening system as it is being assembled, according to one embodiment of the invention FIG. 1A shows a cross-section view of an assembly according to one embodiment of the invention. The assembly 10 comprises a washer 11 assembled onto a fastening nut 12.

The washer 11 comprises an annular base 15 and an encircling, substantially cylindrical skirt 13, arranged along an axis 14 on the outer periphery of the annular base 15.

The skirt 13 and the annular base 15 form a cavity in which a collar 16 of the nut 12 is housed. Said collar 16 is of a substantially cylindrical shape encircling the axis 14. The collar 16 is axially extended by a substantially truncated-cone shaped part 17 whose diameter decreases the further one is from the collar 16 along the axis 14.

The annular base 15 has a circular orifice 18 arranged along the axis 14. Likewise, the nut 12 is axially traversed by a threaded bore 19. At the collar 16, the threaded bore 19 is axially extended by a counterbore 20 whose diameter is greater than said bore.

The annular base 15 is covered with a layer 21 of a viscous composition, of the sealing sealant type. The sealant is capable of forming a liquid-tight seal after polymerization.

Preferentially, the sealant comprises a liquid polysulfide and a reagent capable of releasing oxygen, for example manganese oxide ($MnO_2$). This type of sealant is commonly used in the field of aeronautics, particularly to make fuel tanks leak-proof.

The general structure of a polysulfide monomer has the formula:

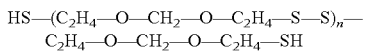

$$HS-(C_2H_4-O-CH_2-O-C_2H_4-S-S)_n-\\C_2H_4-O-CH_2-O-C_2H_4-SH$$

where n is a whole number, generally between 5 and 50, which the viscosity of the polymer is primarily dependent on.

Manganese oxide is a polymerization agent that provides oxygen reacting with a terminal thiol moiety of a monomer unit, which leads to the formation of a disulphide bond between two units. The sealant is then solidified into a sealed layer. Depending on the sealant formulation used, the reaction is finished after a period of 20 minutes to 24 hours at a temperature of about 20° C. For example, the sealants known by the brand names "PR1776" and "PR1762" can be used in the context of the invention.

Table 1 below gives an example sealant composition that may be used in the context of the invention. This sealant comprises a base and a polymerization agent, which must be mixed in order for hardening to occur:

TABLE 1

| Components | Mass percent |
| --- | --- |
| Base: | |
| Calcium carbonate | 26.15 |
| Titanium dioxide | 3.10 |
| Liquid polysulfide | 58.50 |
| Volatile thinner | 2.25 |

TABLE 1-continued

| Components | Mass percent |
| --- | --- |
| Polymerization agent: | |
| Mangagnese dioxide | 5.53 |
| Oil | 3.95 |
| Thinner | 0.51 |

In order to enable the joining of the assembly 10 with a pin to form a leak-proof assembly, the reaction between the polysulfide and manganese oxide should be blocked before said joining with a pin.

According to one embodiment, the assembly 10 comprises a layer 21 of sealant in which the polysulfide is mixed with manganese oxide. For example, the sealant may be made from a mixture between the base and polymerization agent described in table 1. In such a case, it is possible to keep the assembly 10 at a low temperature, until the fastener is installed, in order to block the polymerization reaction.

According to another embodiment, in the layer 21 of sealant, the polymerization agent such as manganese oxide is contained in microcapsules, such as ceramic ones. Thus, the polymerization agent is isolated from the polysulfide until the fastener is installed, as described below.

Since the layer 21 is viscous, it is capable of adhering to a proximal surface 22 of the collar 16 of the nut, so as to hold the washer 11 onto the nut 12.

Furthermore, in the example in FIG. 1, the washer 11 comprises means of snapping onto the nut 12. More specifically, an axial height of the skirt 13 along the axis 14 is greater than an axial height of the collar 16 plus an axial height of the layer 21. An inner surface of the skirt 13 is textured 23 with wedges, which make it possible to snap the washer 11 onto the collar 16 of the nut 12. The nut 12 remains free to rotate with respect to the washer 11 along the axis 14.

In the example in FIG. 1A, the annular base 15 is flat, and forms a 90° angle with the skirt. In one variant embodiment shown in FIG. 1B, that annular base 15 may be shaped like a truncated cone disposed along the axis 14, with the diameter of the cone shrinking the further one is from the skirt. The annular base 15 thus forms an angle greater than 90° with the skirt 13. Preferentially, said angle is between 90° and 120°. In order for the sealant to primarily spread towards the center of the washer's annular base, the washer is designed so that the diameter of its annular base is slightly greater than the outer diameter of the nut collar.

Figure 1C:
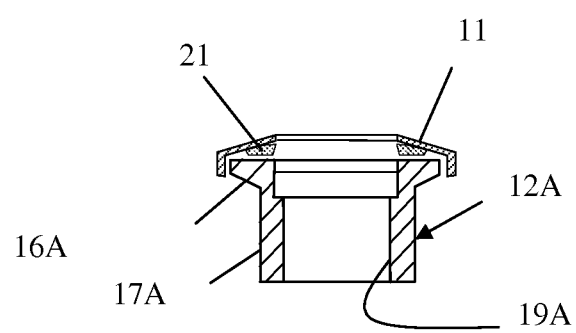

FIG. 1C shows a cross-section view of an assembly 10A according to one embodiment of the invention. The assembly 10A comprises a washer 11 swaged on the perimeter of a collar 12A. The washer is in every respect identical to the one in FIG. 1B, and likewise comprises a layer 21 of sealant on its annular base. In this assembly, the collar 12A is of the type comprising a flange 16A, a smooth tubular portion 17A, and a smooth inner bore 19A. This type of ring is particularly used with interference-fit lockbolts in composite material panels.

Figure 2:
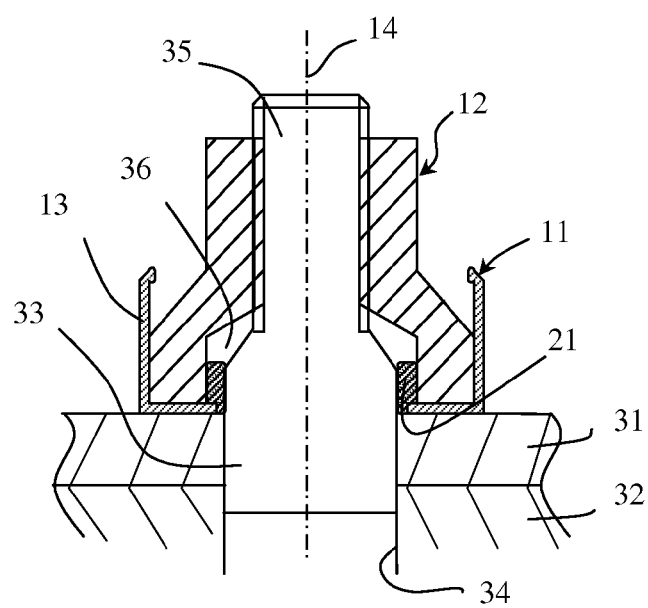

FIG. 2 depicts a fastening system as it is being assembled, according to one embodiment of the invention. The fastening system 30 is intended to rigidly connect structural elements (31, 32), such as aircraft composite panels, in a leak-proof manner.

The fastening system 30 comprises an assembly 10 as depicted in FIG. 1A, particularly with a washer 11 and a nut 12.

The system 30 further comprises a pin 33 that fits into a borehole 34 built into the panels (31, 32). The purpose of the method described below for installing the system 30 is to ensure a seal between the system 30 and the bore 34.

After inserting the pin 33 into the bore 34, a threaded end 35 of the pin is engaged with the threaded bore 19 of the assembly 10, formed of the washer 11, the nut 12, and the sealant layer 21.

At this stage in the installation method, the layer 21 is in the form of a viscous composition such as an uncured sealant. As described above with regard to FIG. 1A, this may be a polysulfide-based composition in which manganese oxide is distributed in microencapsulated form.

Alternatively, the assembly 10 may have been stored at a low temperature after a polysulfide mixture had been deposited onto the washer 11, in contact with a reagent such as manganese oxide.

According to another alternative, the sealant forming the layer 21 is prepared and deposited onto the washer 11 right before it is joined with the nut 12 and said nut mates with the pin 33.

The nut 12 of the assembly 10 is screwed onto the thread of the pin 33 so as to bring the washer 11 into contact with a surface of a fastening element 31.

At this stage, the presence of the viscous layer 21 causes a lower friction force between the washer 11 and the proximal surface 22 of the nut than between said washer and the element 31. This way, the washer 11 remains fixed with respect to the element 31 while the nut continues to be screwed on.

As this happens, the nut 12 comes closer to the washer 11 along the axis 14, which causes the viscous layer 21 to spread. In particular, the sealant is moved towards the axis 14. Such a movement towards the axis is particularly encouraged by the truncated cone shape of the annular base 15, forming an angle greater than 90° with the skirt 13. This is because the collar of the nut first contacts the peripheral perimeter of the annular base, which pushes the sealant towards the center of the annular base. Continuing to screw on the nut forces the annular base to flatten against the structural element while continuing to guide the sealant towards the center of the annular base.

The sealant of the layer 21 will therefore settle into the gaps 36 formed between the nut 12 and the pin 33 and/or between the pin 33 and the bore 34. Depending on the dimensions of the system 30, the volume of the layer 21 is advantageously chosen to sufficiently fill in the gaps 36 in order to make the fastener leak-proof.

Furthermore, when the sealant of the layer 21 comprises a reagent in microencapsulated form, the friction between the nut 12 and the washer 11 breaks the microcapsules and releases the reagent.

In the event that the annular base 15 has a truncated cone shape, the pressure between the nut 12 and the element 31 causes said surface to deform. Fully tightening the nut encourages the flattening of that annular base 15 in order to obtain the configuration shown in FIG. 2.

After the nut 12 has been completely screwed onto the pin 33, the polymerization of the polysulfide causes the sealant to harden, after a period that may, for example, be between 20 minutes and 24 hours. The structure/fastening system assembly is then leak-proof.

Figure 3:
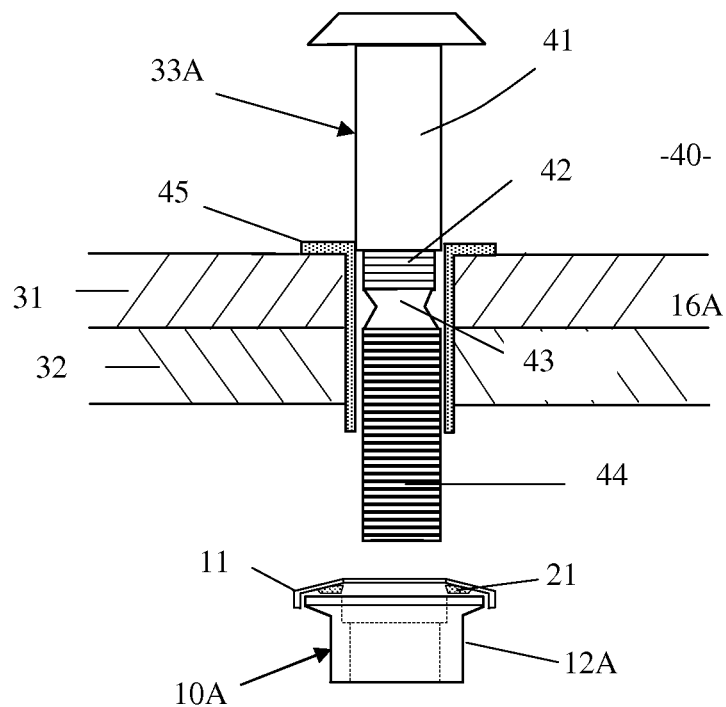

FIG. 3 depicts a fastening system 40 as it is being assembled, according to one embodiment of the invention. The fastening system 40 is intended to rigidly connect structural elements (31, 32), such as aircraft composite panels, in a leak-proof manner.

The fastening system 40 comprises an assembly 10A particularly with a washer 11 and a collar 12A, as depicted in FIG. 1C.

The system 40 comprises a lockbolt 33A comprising a smooth shank 41, a locking portion 42, a breakneck groove 43, a pulling stem 44 that fits into a sleeve 45 inserted with clearance into a hole bored in the panels (31, 32). The purpose of the method described below for installing the system 40 is to ensure a seal between the system 40 and the structure.

The diameter of the smooth shank 41 of the lockbolt is greater than the inner diameter of the sleeve 45. The lockbolt 33A is inserted into the sleeve 45, such that the pulling stem 44 emerges from the panel 32. A tool (not depicted) grasps the pulling stem 44 of the lockbolt, and pulls on it in order to insert the smooth shank 41 into the sleeve 45 until the head of the lockbolt comes in contact with the sleeve. Another tool then swages the collar 12A on the locking portion 42. During swaging, the material of the collar is moved both radially inward, so as to rigidly connect the collar 12A and the locking portion 42 of the lockbolt, and axially in the direction of the panel 32, after the tool is pushed. The washer 12A does not turn around the collar but rather protects the panel, during the swaging of the collar, from deformation forces coming from the collar. When this occurs, the sealant 21 is, as previously described, driven towards the center of the annular base in order to fit into the annular gap formed between the annular base 15 of the washer, the collar 12A, and the sleeve 45. Finally, the pulling stem as broken off by the breakneck groove 43 in order to finalize the assembly.

After the ring 12A has been swaged onto the lockbolt 33A, the polymerization of the polysulfide causes the sealant to harden, after a period that may, for example, be between 20 minutes and 24 hours. The assembly is then leak-proof.

In one variant that is not depicted, the assembly 10 or 10A may be used with a fastener comprising a smooth shank, a thread, a breakneck groove, and a pulling stem; an example of such a fastener is described in the patent U.S. Pat. No. 6,665,922.

In one variant that is not depicted, the washer/nut assembly 10 may also be used with a fastener comprising a smooth shank, a thread, a breakneck groove, a pulling stem, and a sleeve into which the fastener shank is inserted by force; an example of such a fastener is described in the patent EP 1 903 221. This way, the uncured sealant is moved towards the sleeve when the nut is screwed onto the fastener's thread, until it forms a sealing bead around the sleeve.

In one variant that is not depicted, the washer/nut assembly 10 may also be used with a pin and a sleeve, into which the shank of the pin is inserted by force, such as the pin described in the document FR2946707. This way, the uncured sealant is moved towards the sleeve when the nut is screwed onto the pin, until it forms a sealing bead around the sleeve.

The invention claimed is:

1. An assembly comprising a washer and a female fastener onto which the washer is assembled, said washer comprising an annular base and a substantially cylindrical skirt rigidly connected to an outer periphery of the annular base, the annular base being at least partially covered with a layer of a viscous composition capable of forming a liquid-tight seal through polymerization, characterized in that the female fastener is assembled onto the washer and the female fastener and the washer are adhered together by the layer of the viscous composition in an uncured state before joining with a mating fastener and while allowing rotation between the female fastener and the washer.

2. An assembly according to claim 1, such that the female fastener is a nut or a collar.

3. An assembly according to claim 1, such that the skirt of the washer has an elastic skirt portion for joining with the female fastener, said elastic skirt portion allowing the female fastener to rotate with respect to the washer.

4. An assembly according to claim 1, such that the viscous composition comprises a liquid polysulfide and a reagent capable of releasing oxygen.

5. An assembly according to claim 4, such that the reagent capable of releasing oxygen is manganese dioxide.

6. An assembly according to claim 5, such that the liquid polysulfide and/or reagent capable of releasing oxygen are in microencapsulated form in the viscous composition.

7. An assembly according to claim 5, such that the liquid polysulfide and/or reagent capable of releasing oxygen are in mixed form in the viscous composition.

8. An assembly according to claim 4, such that the liquid polysulfide and/or reagent capable of releasing oxygen are in microencapsulated form in the viscous composition.

9. An assembly according to claim 4, such that the liquid polysulfide and/or reagent capable of releasing oxygen are in mixed form in the viscous composition.

10. An assembly according to claim 1, such that the annular base is flat or truncated-cone-shaped.

11. An assembly according to claim 1, such that the annular base forms an angle greater than or equal to 90° with the skirt.

12. A leak-proof assembly method of a fastening system, said system comprising:
    an assembly including a washer and a female fastener onto which the washer is assembled, said washer comprising an annular base and a substantially cylindrical skirt rigidly connected to an outer periphery of the annular base, the annular base being at least partially covered with a layer of a viscous composition capable of forming a liquid-tight seal through polymerization, wherein the female fastener is assembled onto the washer by adhering to the layer of the viscous composition before assembly onto a male fastener,
    said assembly comprising the female fastener being free to rotate with respect to the washer, the layer of viscous composition being located between a proximal plane of the female fastener and an annular base of the washer,
    a male fastener having an end capable of cooperating with the female fastener, said method comprising the following steps:
    inserting the male fastener into a bore of structural elements to be fastened;
    installing the assembly onto the end of the male fastener, to the point that the washer is brought in contact with one of the structural elements to be fastened, in order to lock the axial rotation of said washer relative to said structural element;
    installing the female fastener onto the male fastener, its movement relative to the washer causing the viscous composition layer to spread towards the axis of the annular base in order to fill in the gaps formed between the male fastener, the female fastener, and the bore;
    after full installation of the female fastener, hardening the viscous composition through polymerization, so as to make the system and the structural elements leak-proof.

13. A method according to claim 12, such that:
    the annular base of the washer supporting the layer of a viscous composition is truncated-cone-shaped;
    installing the female fastener causes said annular base to compress between a structural element and the flat proximal face of the female fastener, said compression causing said annular base of the washer to flatten.

14. A method according to claim 12, wherein the male fastener is a pin, a lockbolt, a pin with a sleeve, or a lockbolt with a sleeve.

15. A leak-proof assembly method of a fastening system, said system comprising:
    an assembly including a washer and a female fastener onto which the washer is assembled, said washer including an annular base and a substantially cylindrical skirt rigidly connected to an outer periphery of the annular base, the annular base being at least partially covered with a layer of a viscous composition capable of forming a liquid-tight seal through polymerization, wherein the viscous composition includes a liquid polysulfide and a reagent capable of releasing oxygen, wherein the liquid polysulfide and/or reagent capable of releasing oxygen are in microencapsulated form in the viscous composition, wherein the female fastener is assembled onto the washer by adhering to the layer of the viscous composition before assembly onto a male fastener,
    wherein the female fastener is free to rotate with respect to the washer, the layer of viscous composition being located between a proximal plane of the female fastener and an annular base of the washer,
    a male fastener having an end capable of cooperating with the female fastener, said method comprising the following steps:
    inserting the male fastener into a bore of structural elements to be fastened;
    installing the assembly onto the end of the male fastener, to the point that the washer is brought in contact with one of the structural elements to be fastened, in order to lock the axial rotation of said washer relative to said structural element;
    installing the female fastener onto the male fastener, the movement of said female fastener relative to the washer causing the viscous composition layer to spread towards the axis of the annular base in order to fill in the gaps formed between the male fastener, the female fastener, and the bore;
    said movement of the female fastener relative to the washer also causing the microcapsules to break and the liquid polysulfide and reagent capable of releasing oxygen to mix with the viscous composition;
    after full installation of the female fastener, hardening the viscous composition through polymerization, so as to make the system and the structural elements leak-proof.

* * * * *